United States Patent Office 3,137,472
Patented June 16, 1964

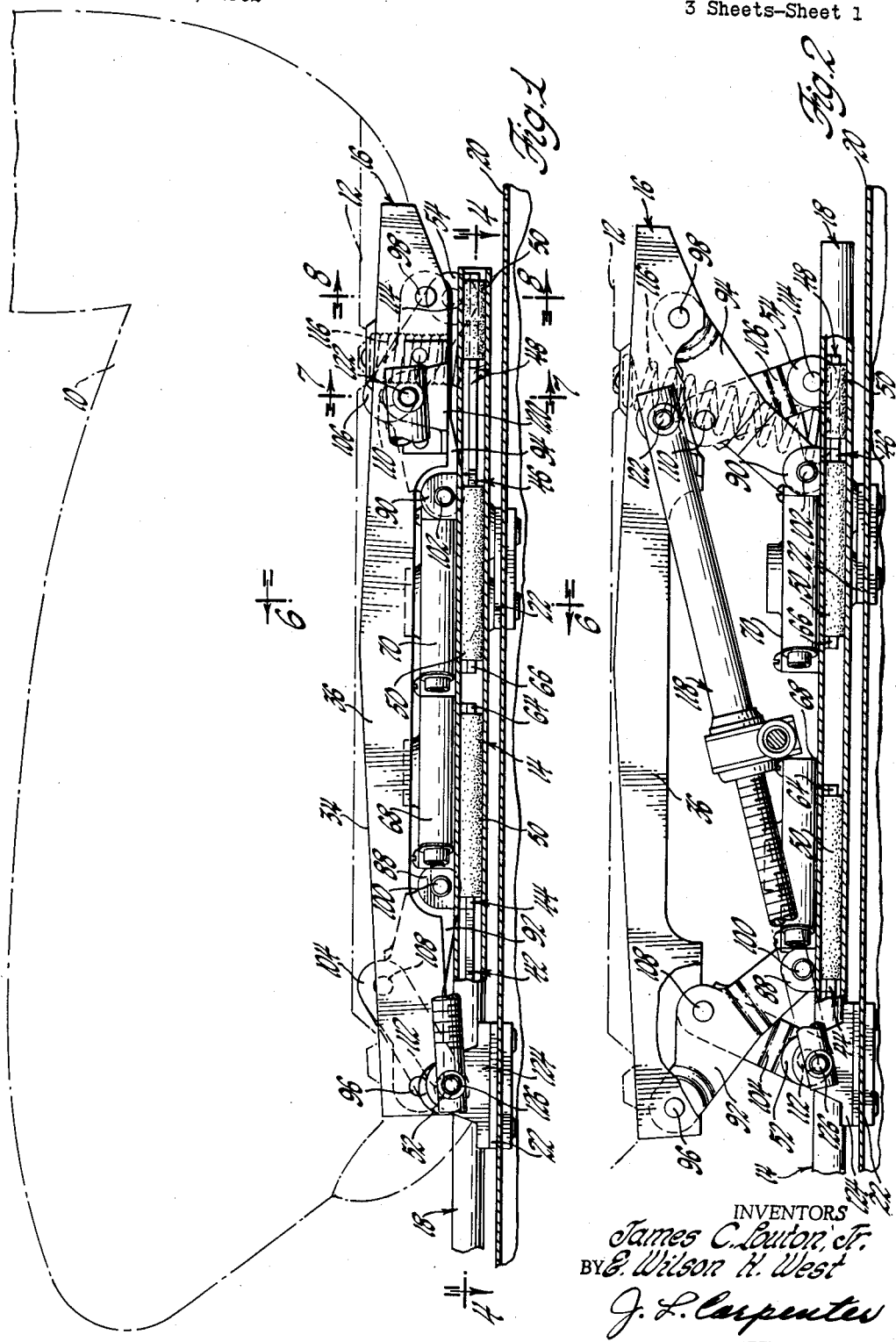

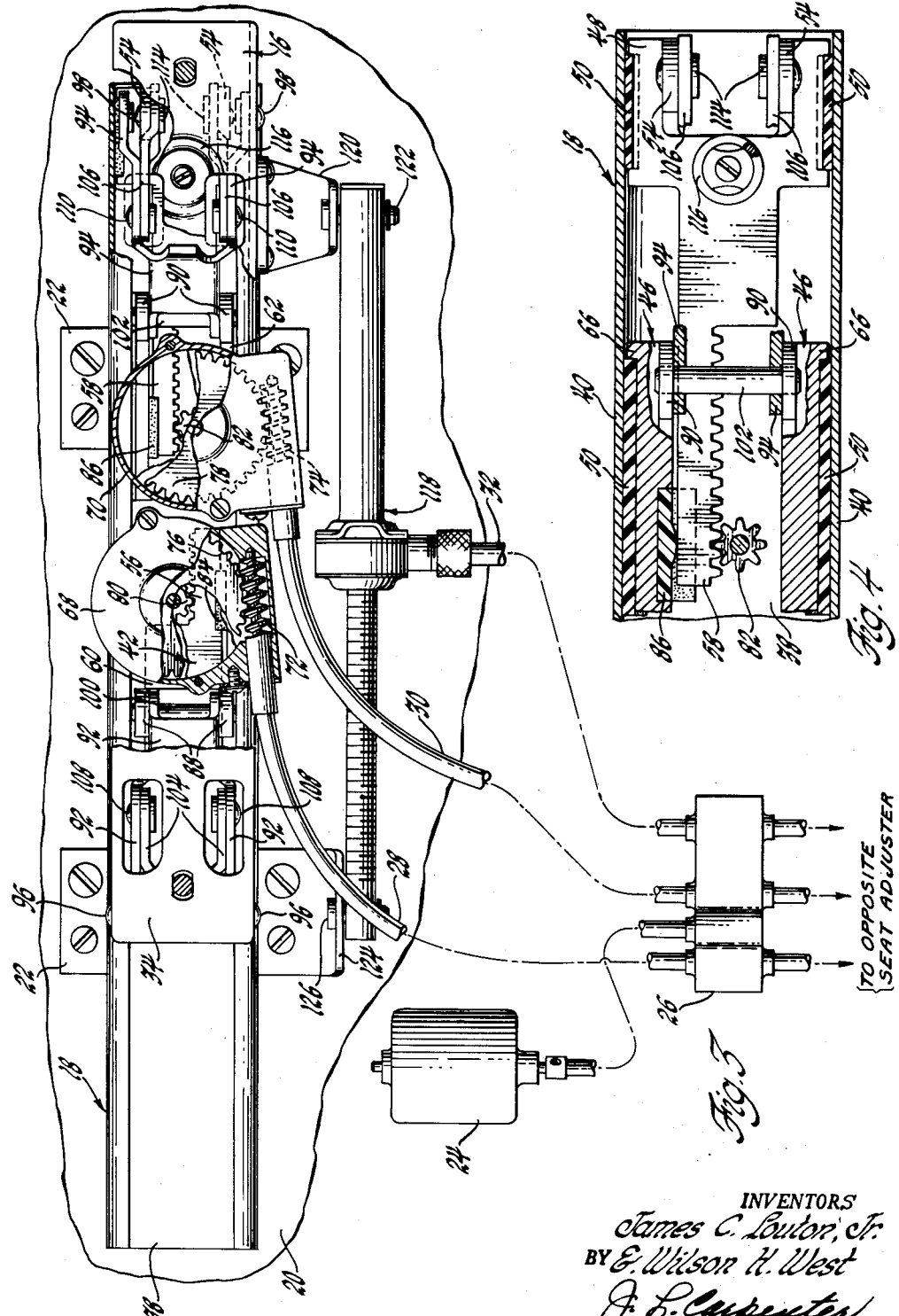

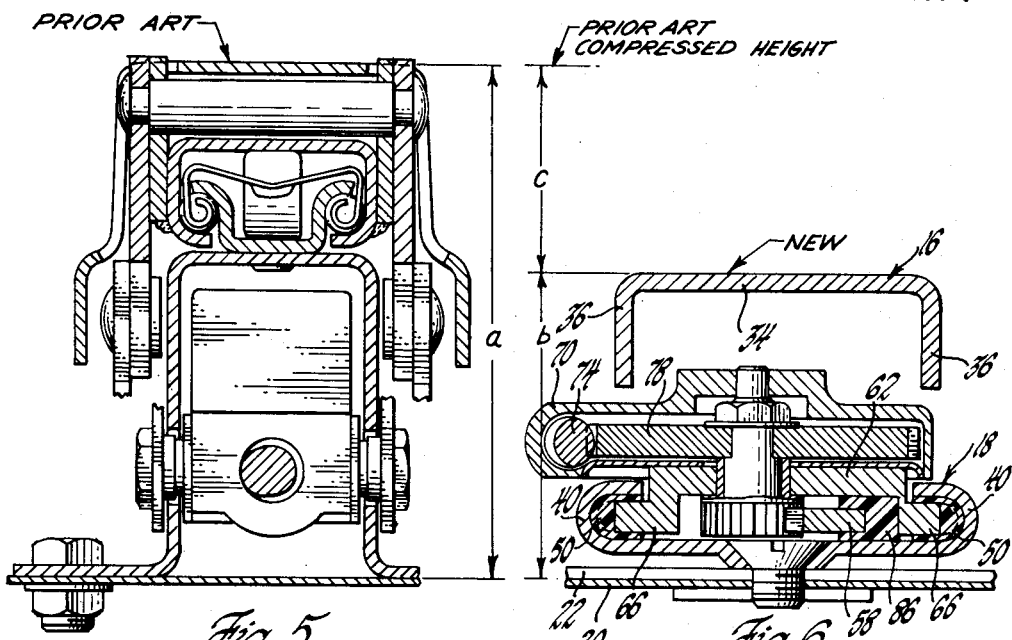
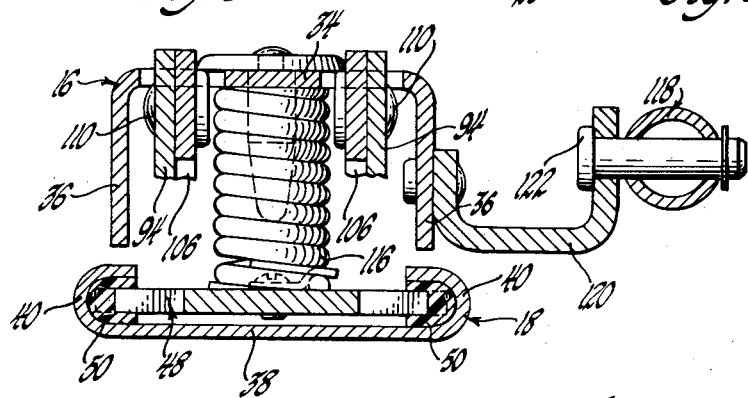
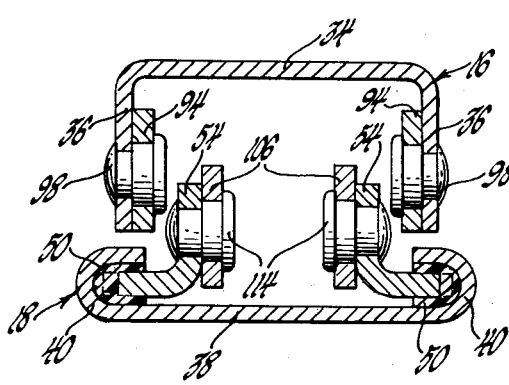

3,137,472
VEHICLE SEAT ADJUSTER
James C. Louton, Jr., Utica, and Wilson H. West, Madison Heights, Mich., assignors to General Motors Corporation, Detroit, Mich., a corporation of Delaware
Filed Feb. 27, 1962, Ser. No. 175,910
5 Claims. (Cl. 248—371)

This invention relates to vehicle seat adjusters and more particularly to a unit of the type which provides for tilting, vertical and horizontal adjustment.

The trend in the automobile industry is to lower the silhouette of an automobile. As the roof line of the vehicle is lowered less vertical space is available between the floor of the vehicle and the roof thereof for the occupant, the seat and the seat adjuster. Therefore, it is an object of this invention to provide a compact seat adjuster better adapted to be fitted in the available space without sacrificing strength or economy of construction.

In the drawing:

FIGURE 1 is a side elevational view, partly in section, of the unique seat adjuster in the fully down position having a seat supported thereon.

FIGURE 2 is a side elevation, partly in section, of the seat adjuster in the fully up position.

FIGURE 3 is a plan view, partly in section, of one side of the seat adjuster showing motor and transmission connected thereto.

FIGURE 4 is a view taken substantially along the line 4—4 of FIGURE 1 with parts broken away.

FIGURE 5 is a transverse section of a conventional six-way seat adjuster known in the prior art at its compressed height.

FIGURE 6 is a sectional view of the seat adjuster taken substantially along line 6—6 of FIGURE 1 to illustrate compressed height of the unique seat adjuster and showing the position of the gear box on the slide plate.

FIGURE 7 is a sectional view of the seat adjuster taken substantially along the line 7—7 of FIGURE 1 showing the position of the assist spring and attaching bracket for the horizontal actuator.

FIGURE 8 is a sectional view of the seat adjuster taken substantially along line 8—8 of FIGURE 1 showing the position of the vertical control links relative to the seat adjuster tracks.

It is to be understood that seat adjusters of this type are generally used in pairs and for ease of explanation only a right adjuster will be described. Parts for seat adjusters are made from sheet metal stampings and often for strength requirements two links are used which perform parallel and identical movements and functions. In this description, one reference numeral will be used to identify parallel links or rivets.

Referring now to the drawings, and particularly FIGURES 1 and 3, there is shown a vehicle seat 10 mounted on a frame 12, supported by a seat adjuster indicated generally by numeral 14. The seat adjuster 14 has an upper support member 16 secured by rivets or other suitable means to the seat frame 12 and a lower support member 18 secured to the vehicle floor 20.

The lower support member 18 may be secured directly to the vehicle floor 20 by bolts or other suitable means or as shown in the drawings, the lower support member 18 may be secured to stools 22 which in turn are attached to the vehicle floor 20 by suitable means.

The seat adjuster 14 is powered by a reversible electric motor 24 distributing power to the various elements of the seat adjuster through a conventional selective transmission 26 by means of flexible power cables 28, 30 and 32.

As seen in FIGURES 2, 7 and 8, the upper support member 16 is channel shaped having a web section 34 with the depending flanges 36. The lower support member 18 is an elongated channel member, generally C-shaped in transverse section having a base section 38 merging with upwardly curved walls 40 at each side. The curved walls 40 provide a bearing surface for four slide plates 42, 44, 46 and 48 mounted between the curved wall portions 40 and parallel to the base section 38. Anti-friction bearing slugs 50, preferably of nylon, are fixedly mounted on the edges at slide plates 42, 44, 46 and 48 with the outer surface of the slugs 50 curved on the same curvature as the inner surface of the walls 40 of the lower support member 18 so that the slugs 50 are in sliding engagement therewith.

The outer ends of the front and rear slide plates 42, 48 are bifurcated with upwardly extended pivot flanges 52, 54. The inner ends of slide plates 42, 48 are formed with rack arms 56, 58, as can be seen in FIGURE 4 which shows a plan view of the rear slide plate 48.

The center slide plates 44, 46 are generally U shaped in transverse cross section, as seen in FIGURE 6, having bases 60, 62 and opposite standing walls, each wall terminating in an outwardly extending flange 64, 66 to which are secured the anti-friction slugs 50. The base sections 60, 62 support gear boxes 68, 70 secured thereto by screws or other suitable means. The gear boxes 68, 70 contain worms 72, 74 in meshing engagement with worm gears 76, 78. Coaxially mounted with the worm gears 76, 78 are pinions 80, 82 which extend below the bases 60, 62 of the U-shaped slide plates 44, 46 and mesh with the teeth of rack arms 56, 58 which extend below the base sections 60, 62 on the same plane as flange 64, 66. The rack arms 56, 58 are biased into engagement with pinions 80, 82 by nylon slides 84, 86. The nylon slides 84, 86 are attached to the center slide plates 44, 46 and also support the rack arms 56, 58. The outer ends of the center slide plates 44, 46 have upwardly extending pivot flanges 88, 90.

The upper support member 16 is pivotally connected to the slide plates 44, 46 by lift arms 92, 94. The lift arms 92, 94 are pivotally connected to the depending flange 36 by rivets 96, 98 and to the pivot flanges 88, 90 of the center slide plates 44, 46 by pins 100, 102. Thus, is can be seen, the upper support member 16 is pivotally and slidably connected to the lower support member 18 by the lift arms 92, 94 through the slide plates 44, 46.

Intermediate the ends of lift arms 92, 94 control links 104, 106 are pivotally connected by rivets 108, 110. The other ends of control links 104, 106 are pivotally connected to pivot flanges 52, 54 of slide plates 42, 48 by rivets 112, 114.

The vertical linkages at the front and rear of this seat adjuster are identical but reversed. Therefore, only the operation of the rear vertical adjuster will be described and it is to be understood that the front vertical adjuster operates in a similar manner.

To operate the vertical linkage, a control switch (not shown) of conventional design is actuated. The motor 24 supplies power to the transmission 26 and the power is transmitted by flexible cable 30 to worm 74. As worm 74 rotates, worm gear 78, which is in meshing engagement with worm 74, rotates and pinion 82 also rotates since it is coaxially mounted on the same shaft as worm gear 78. As the pinion 82 rotates, the rack arm 58, in meshing engagement with pinion 82, moves toward or away from slide plate 46 depending upon the direction of rotation of pinion 82. Rack arm 58 is part of slide plate 48, therefore, slide plate 48 moves relative to slide plate 46.

The relative movement of slide plates 46, 48 causes the rear lift arm 94 and the rear control link 106 to act in a semi-scissors manner. The rear lift arm 94 is pivotally connected to the slide plate 46 by pin 102, rear control link 106 by rivet 110 and upper support member 16 by rivet 98. The rear control link 106 is pivotally connected by rivet 110 intermediate the ends of lift arm 94 and is also pivotally connected to the rear slide plate 48 by rivet 114. Thus, as the slide plates 46, 48 are moved together, the upper support member 16 is raised by the counterclockwise rotation of lift arm 94 about pin 102 and conversely as they move apart the upper support member 16 is lowered.

An assist spring 116 is mounted between slide plate 48 and upper support member 16 and exerts pressure tending to separate them. Since more weight is concentrated at the rear of a seat, an assist spring is deemed necessary only at the rear. An assist spring could be added to the front linkages or the rear assist spring could be removed without departing from the scope of this invention. The main purpose of the assist spring is to help equalize the loading of the motor for up and down movement of the seat.

For horizontal adjustment of the seat adjuster unit a jack screw 118 is pivotally connected to the upper support member 16 and the lower support member 18. Secured to the upper support member 16 by rivets or other suitable means is a bracket 120 to which is pivotally connected the jack screw 118 by rivet 122. The lower end of the jack screw 118 is connected to the lower support member 18 by being pivotally connected to an arm 124 of stool 22 by rivet 126. If the lower support member 18 is secured directly to the floor, a bracket may be used which would be connected to the lower support member 18 or floor by suitable means and provide an attaching surface for the jack screw. When power is supplied through flexible cable 32 to extend or contract the jack screw 118 the multi-sectioned upper track consisting of four slide plates 42, 44, 46, 48 moves as a unit and acts as a conventional track in moving relative to the lower support member 18, which also acts as the lower track for the horizontal adjustment.

Looking now to FIGURES 5 and 6, the relative height of the prior art to the present invention can be seen. FIGURE 5 shows the prior art with its height indicated by letter "a" and FIGURE 6 shows the present invention with its height indicated by letter "b." The difference in the compressed heights is indicated by letter "c." It can be seen by comparison of FIGURES 5 and 6 that the new seat adjuster requires less vertical space than the conventional stacked seat adjuster.

While but one embodiment of the invention has been shown and described, it will be evident that numerous changes and modifications may be made therein. It is, therefore, to be understood that it is not intended to limit this invention to the embodiments shown but only by the scope of the claims which follows.

We claim:
1. A vehicle seat adjuster unit comprising a vehicle seat, an upper support member supporting said seat, a lower support member secured to a vehicle floor, front and rear linkages connected between said members for selectively moving the front and rear of the seat in a vertical direction, said front and rear linkages being pivotally connected to said upper support member, horizontal actuating means for moving the seat fore and aft wherein said lower support member acts as an elongated lower track for receiving a multi-section upper track consisting of four slide plates, each slide plate pivotally supporting one link of said linkages, said slide plates being divided into a front pair consisting of the two front slide plates and a rear pair consisting of the two rear slide plates, the front pair of slide plates being connected to links of the front linkage and the rear pair of slide plates being connected to the links of the rear linkage, each pair of slide plates consisting of a first slide plate supporting a pinion with the pinion being free to rotate about its axis but secured from other motion relative to the first slide plate and a second slide plate being formed with a rack arm, the pinion connected to the first slide plate being in meshing engagement with the rack arm of the second slide plate so that rotation of the pinion will move the second slide plate relative to the first slide plate in a fore and aft direction, each of said linkages consisting of two links, a first link having one end pivotally connected to said upper support member and the other end being pivotally connected to one slide plate of the pair of slide plates associated with the linkage, a second link having one end pivotally connected to the first link intermediate its ends and the other end of the second link being pivotally connected to the remaining slide plate of the associated pair and selective power means to reversibly drive the pinions for relative movement of the second slide plates relative to the first slide plates in a fore and aft direction which will cause the first links and second links to coact in a semi-scissor movement thereby moving the upper support member in a vertical direction relative to the lower support member and reversible power means to drive a jack screw pivotally connected between the lower support member and the upper support member for horizontal adjustment of the seat adjuster.

2. A vehicle seat adjuster unit comprising an upper seat support member, a seat supported upon said member, a lower support member fixed against movement, means for moving the front and rear of said seat in a vertical direction, said means including front and rear linkages pivotally connected to said upper support member and slidably movable with respect to said lower support member and also including selectively operable power means for selectively adjusting the position of said linkages with respect to said lower support member, horizontal actuating means for selectively moving said seat fore and aft including four side plates slidably supported on said lower support member, said slide plates including a front pair pivotally connected to said front linkages and a rear pair pivotally connected to said rear linkages, power means for simultaneously moving all of said slide plates in said lower support member for horizontally adjusting the position of the seat, each pair of said slide plates having a pinion supported upon one plate of said pairs, each pair of said slide plates having a rack supported upon the other plate of said pairs and in mesh with one of said pinions, and power means for selectively driving said pinions for moving said slide plates of each pair relative to each other for vertically adjusting the position of said seat.

3. In a vehicle seat adjuster unit having a seat, a member for supporting said seat, a second member spaced from said first member and secured from movement, a vertical adjusting means interconnecting said members for moving one of said members vertically relative to the other of said members including a linkage pivotally connected to one of said members, a pair of slide plate members slidably supported on the other of said members for longitudinal movement thereon, each slide member pivotally supporting a link of said linkage, a pinion secured on one of said slide members, said pinion being free to rotate about its axis, the other slide member having a rack arm secured thereto, said rack arm being in meshing engagement with said pinion in such a manner that rotation of the pinion will move the one slide plate relative to the other slide plate longitudinally on said one member, and power means for reversibly driving said pinion whereby the linkage will be adjusted by relative movement of the slide members thereby vertically adjusting the seat.

4. In combination with a vehicle seat in a vehicle body, a seat adjuster unit for vertically adjusting the seat comprising, a first support member for supporting said seat, a front linkage and a rear linkage pivotally secured to said first member for selectively vertically adjusting the front and the rear of said seat, a front and a rear pair of slide plates pivotally supporting said respective linkages, each pair of slide plates having a first and a second plate, a second support member secured to the vehicle body and slidably supporting said slide plates for sliding movement longitudinally along said second member, each of said linkages consisting of a first link having one end pivotally secured to said first member and the other end pivotally connected to one of said associated pair of slide plates, a second link having one end pivotally connected to the first link intermediate its ends and the other end pivotally connected to the remaining slide plate of said associated pair, means for slidably moving each one of each pair of said slide plates relative to each other including a pinion secured to said first slide plate for rotation about its axis, a rack arm on said second slide plate in meshing engagement with said pinion for moving said slide plates relative to each other when said pinion is rotated, and reversible power means for rotatably actuating said pinion wherein movement of said second slide plate relative to said first slide plate will move the ends of the first and second links causing said links to coact in a semi-scissor movement thereby moving the first support member vertically relative to said second support member and adjusting the seat vertically.

5. A vehicle seat adjuster unit comprising a vehicle seat, an upper support member supporting said seat, a lower support secured to a vehicle floor, front and rear linkages connected between said members for selectively moving the front and rear, respectively, of said seat in a vertical direction, said front and rear linkages being pivotally connected to said upper support member, said lower support member comprising an elongated track for slidably securing a plurality of slide plates thereon, a front pair of slide plates supported in said track, a pivotal connection between each of said first pair of slide plates, respectively, and said front linkage, a rear pair of slide plates supported in said track, a pivotal connection between each of said rear pair of slide plates, respectively, and said rear linkage, a pinion rotatably supported on a first one of each of said pair of slide plates, a rack on a second one of each pair of said slide plates and in mesh with one of said pinions, respectively, for moving said slide plates relative to each other in response to rotation of said pinion, reversible power means for driving said pinions for raising and lowering said seat, means for imparting horizontal motion to said seat including an extensible and contractible member, means pivotally connecting said last mentioned member to said upper and lower support members, respectively, and power means for actuating said extensible and contractible member.

References Cited in the file of this patent

UNITED STATES PATENTS

| 3,022,975 | Horton | Feb. 27, 1962 |

FOREIGN PATENTS

| 2,271 | Great Britain | Aug. 13, 1862 |
| 587,920 | Great Britain | May 8, 1947 |